United States Patent
Srinivasan

(10) Patent No.: US 9,560,049 B2
(45) Date of Patent: Jan. 31, 2017

(54) METHOD AND SYSTEM FOR OPTIMIZING NETWORK ACCESS CONTROL

(75) Inventor: Babu Srinivasan, Bangalore (IN)

(73) Assignee: ARRIS Enterprises, Inc., Suwanee, GA (US)

( * ) Notice: Subject to any disclaimer, the term of this patent is extended or adjusted under 35 U.S.C. 154(b) by 901 days.

(21) Appl. No.: 12/128,103

(22) Filed: May 28, 2008

(65) Prior Publication Data

US 2009/0300179 A1    Dec. 3, 2009

(51) Int. Cl.
| | |
|---|---|
| *H04L 12/911* | (2013.01) |
| *G06F 21/57* | (2013.01) |
| *H04L 29/06* | (2006.01) |
| *H04N 21/262* | (2011.01) |
| *G06F 9/445* | (2006.01) |

(52) U.S. Cl.
CPC .......... *H04L 63/10* (2013.01); *G06F 8/65* (2013.01); *H04L 63/102* (2013.01); *H04L 69/28* (2013.01); *H04N 21/26291* (2013.01)

(58) Field of Classification Search
USPC ........................................ 709/225
See application file for complete search history.

(56) References Cited

U.S. PATENT DOCUMENTS

| 6,363,524 | B1* | 3/2002 | Loy ................................. 717/170 |
|---|---|---|---|
| 7,650,379 | B2* | 1/2010 | Hart et al. .................... 709/203 |
| 2005/0091651 | A1* | 4/2005 | Curtis et al. .................. 717/168 |
| 2005/0257214 | A1* | 11/2005 | Moshir et al. ................ 717/171 |
| 2005/0267954 | A1* | 12/2005 | Lewis et al. .................. 709/221 |
| 2006/0168120 | A1* | 7/2006 | Parham .......................... 709/218 |
| 2006/0218635 | A1* | 9/2006 | Kramer et al. ................. 726/22 |
| 2006/0282834 | A1* | 12/2006 | Cheng et al. .................. 717/174 |
| 2009/0037497 | A1* | 2/2009 | Makansi et al. .............. 707/204 |
| 2009/0094378 | A1* | 4/2009 | Reus et al. .................... 709/235 |
| 2009/0119681 | A1* | 5/2009 | Bhogal et al. ................ 719/318 |
| 2009/0210868 | A1* | 8/2009 | Parthasarathy ............... 717/169 |

* cited by examiner

*Primary Examiner* — Aaron Strange
(74) *Attorney, Agent, or Firm* — Stewart M. Wiener

(57) ABSTRACT

A method and system for optimizing network access control are disclosed. For example, the method includes receiving an access request to a network from a device. Then, the method determines if each one of one or more critical updates of said device is current and if each one of one or more non-critical updates of the device is current. The method concludes by granting the access request to the network if each one of the one or more critical updates of the device is current, even if at least one non-critical update of the one or more non-critical updates of the device is not current.

18 Claims, 4 Drawing Sheets

METHOD AND SYSTEM FOR OPTIMIZING NETWORK ACCESS CONTROL

FIELD OF THE INVENTION

The present invention relates to accessing networks and, in particular, optimizing network access control.

BACKGROUND

Currently, when users attempt to access a network via a device, such as for example, a laptop, a desktop computer, a personal digital assistant (PDA), a cellular telephone and the like, the device must be compliant before access to the network is granted. For example, the network may verify that the device has a certificate of health (COH) or a statement of health (SOH) before granting access to the network. A COH or SOH may be issued to the device if all updates on a device are current.

However, the drawback to the current use of COH and SOH is that even if a non-critical update is not current, the device may be denied access to the network. Moreover, if both a critical update and a non-critical update are not current, then the device will be required to update both the critical update and non-critical update before gaining access to the network. Due to the large size of the critical and non-critical updates, a user may be required to wait an unacceptable period of time to update the critical and non-critical updates.

SUMMARY

In one embodiment, the present invention discloses a method, computer readable medium and system for optimizing network access control. For example, the method comprises receiving an access request to a network from a device. Then, the method determines if each one of one or more critical updates of said device is current and if each one of one or more non-critical updates of said device is current. The method concludes by granting said access request to said network if each one of said one or more critical updates of said device is current, even if at least one non-critical update of said one or more non-critical updates of said device is not current.

In another illustrative embodiment, the present invention discloses a computer readable medium having stored thereon a plurality of instructions, the plurality of instructions including instructions which, when executed by a processor, cause the processor to perform the steps of a method for optimizing network access control. When executed, the method comprises receiving an access request to a network from a device. Then, the method determines if each one of one or more critical updates of said device is current and if each one of one or more non-critical updates of said device is current. The method concludes by granting said access request to said network if each one of said one or more critical updates of said device is current, even if at least one non-critical update of said one or more non-critical updates of said device is not current.

In another illustrative embodiment, the present invention discloses a system for optimizing network access control. For example, the system comprises an application server for receiving an access request to a network from a device, determining if each one of one or more critical updates of said device is current, determining if each one of one or more non-critical updates of said device is current and granting said access request to said network if each one of said one or more critical updates of said device is current, even if at least one non-critical update of said one or more non-critical updates of said device is not current, a database coupled to said application server for storing one or more current critical updates and one or more current non-critical updates and a policy manager, coupled to said application server for updating said one or more current critical updates and said one or more current non-critical updates.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
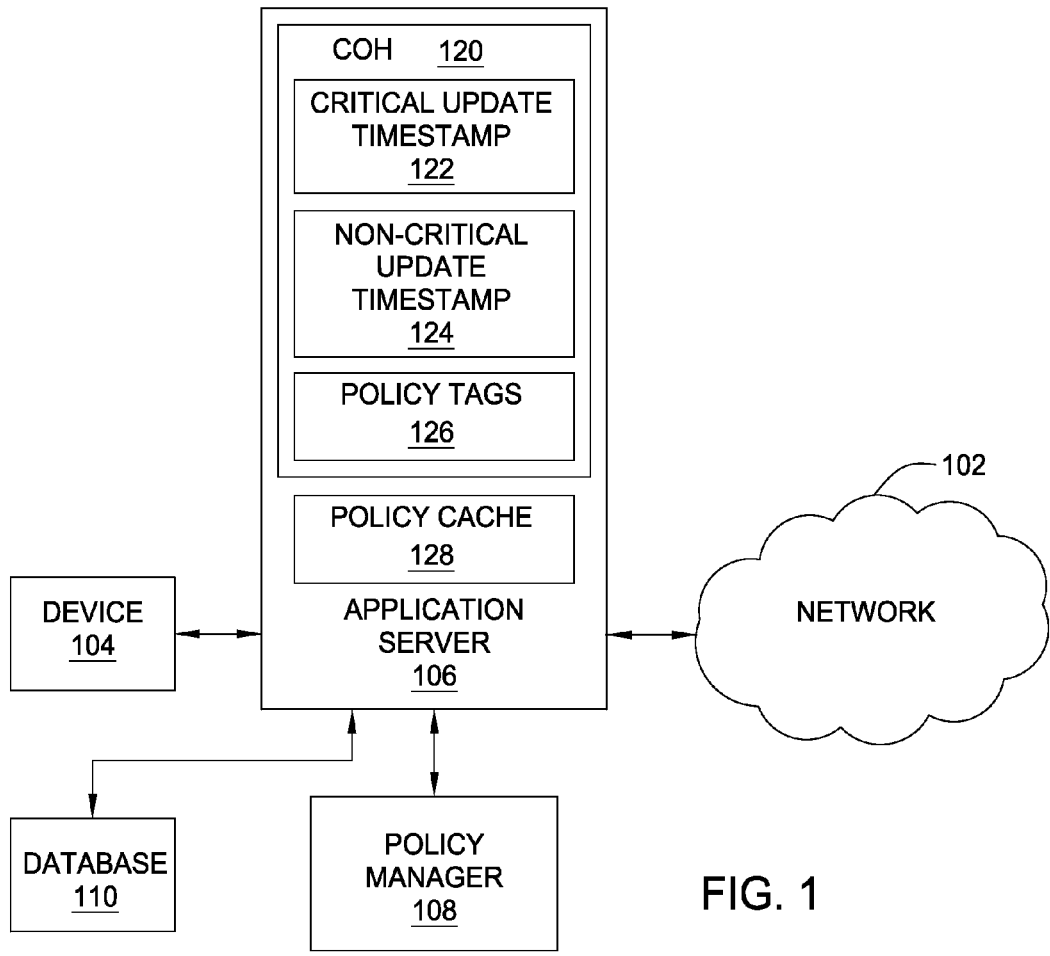
FIG. 1 illustrates a high level block diagram of an illustrative network architecture in accordance with an embodiment of the present invention.

FIG. 1 illustrates a high level block diagram of an illustrative network architecture 100 of the present invention. In one embodiment, network architecture 100 includes a network 102, a device 104, an application server 106, a policy manager 108 and a database 110. Network 102 may be any type of network for example a corporate intranet, an internet, a local area network (LAN), a wide area network (WAN) and the like.

The device 104 may be any type of device capable of accessing the network 102, such as for example, a laptop computer, a desktop computer, a personal digital assistant (PDA), a cellular telephone, a MP3 player with networking capability, and the like. In addition, those skilled in the art may recognize that the present application may apply to one or more devices 104.

Each device 104 may contain a critical update timestamp associated with one or more critical updates and a non-critical update timestamp associated with one or more non-critical updates. The critical update timestamp associated with all of the critical updates for every device 104 that attempts to access network 102 must be current. Critical updates may be updates necessary to prevent the security of network 102 from being comprised, for example, security patches, virus updates and the like.

In contrast, the non-critical update timestamp associated with all of the non-critical updates for every device 104 that attempts to access network 102 do not need to be current. Non-critical updates may be for example, software program updates, software patches, new programs and the like.

In one embodiment, the critical update timestamp and the non-critical update timestamp indicate a date and time the last update was received for the one of the one or more critical updates and the one or more non-critical updates, respectively. This information may be used, as will be discussed below, in determining whether a device 104 attempting to access the network 102 will be granted access to the network 102 and if not, how the device 104 will be managed.

As will be discussed below, this information may be found on an issued certificate of health (COH) 120, also known as a statement of health (SOH). The COH 120 may be generated and stored at the application server 106 and issued from the application server 106 to the device 104 after any missing critical updates and/or non-critical updates are provided.

The COH 120 may contain a critical update timestamp 122, a non-critical update timestamp 124 and a list of policy tags 126. The policy tags may represent a naming convention of the critical and non-critical updates. For example, the policy tags may include Vendor, Platform, Role, Operator, etc. Each policy tag may be classified as critical or non-critical. Thus, in one embodiment, to gain access to the network 102, the device 104 may simply present the COH 120. However, those skilled in the art will recognize that there may be other ways of summarizing whether the critical and non-critical updates of the device 104 are current.

The application server 106 may serve as a gateway between the device 104 and the network 102. In one embodiment, the application server 106 may be an authentication, authorization and/or auditing (AAA) server. The application server 106 ensures that any device 104 that attempts to access the network 102 is compliant (e.g. all the critical updates are current). The application server may ensure that device 104 is compliant by comparing the critical update timestamp of the device 104 to each one of one or more critical updates (e.g. a plurality of policy tags) with a corresponding timestamp currently stored in the application server 106 and received from the policy manager 108. For example, as discussed below, the updates of each of the timestamps for each policy tag received from the policy manager 108 may be stored at the application server 106 in a policy cache 128. If any one of the one or more critical updates on the application server 106 has a timestamp that is newer than the critical update timestamp of the device 104, the device 104 may be deemed non-compliant. A similar comparison may be made for the non-critical update timestamp of the device 104. Further details will be discussed below with reference to FIGS. 2, 3A and 3B.

The policy manager 108 may be coupled to the application server 106. The policy manager maintains the most current timestamp for each one of the one or more critical updates and each one of the one or more non-critical updates. For example, the policy manager 108 may store a list of timestamps for current critical updates and for current non-critical updates. Whenever a timestamp for any of the current critical updates or current non-critical updates changes, the policy manager 108 may notify the application server 106 and may update the list of timestamps stored in the policy cache 128 at the application server 106.

The database 110 may also be coupled to the application server 106. The database 110 may store all the current critical and non-critical updates. For example, if the device 104 requires a critical security patch update, the application server 106 may feed the critical security patch update to the device 104 from the database 110.

Although the present example depicts the application server 106, the policy manager 108 and the database 110 as separate pieces of hardware, one skilled in the art will recognize that other configurations are possible. For example, the application server 106, the policy manager 108 and the database 110 may all be implemented in a single server. Alternatively, the policy manager 108 may be part of the application server 106 and only the database 110 may be a separate device coupled to the application server 106. Other configurations may be possible and are not limited to the configurations described above.

In addition, although the application server 106, the policy manager 108 and the database 110 are illustrated as being outside of the network 102, those skilled in the art may recognize that one or more of these device may also be located within the network 102. For example, the application server 106, the policy manager 108 and the database 110 may be located within the network 102. Other configurations may be possible and are not limited to the configurations described above.

Figure 2:
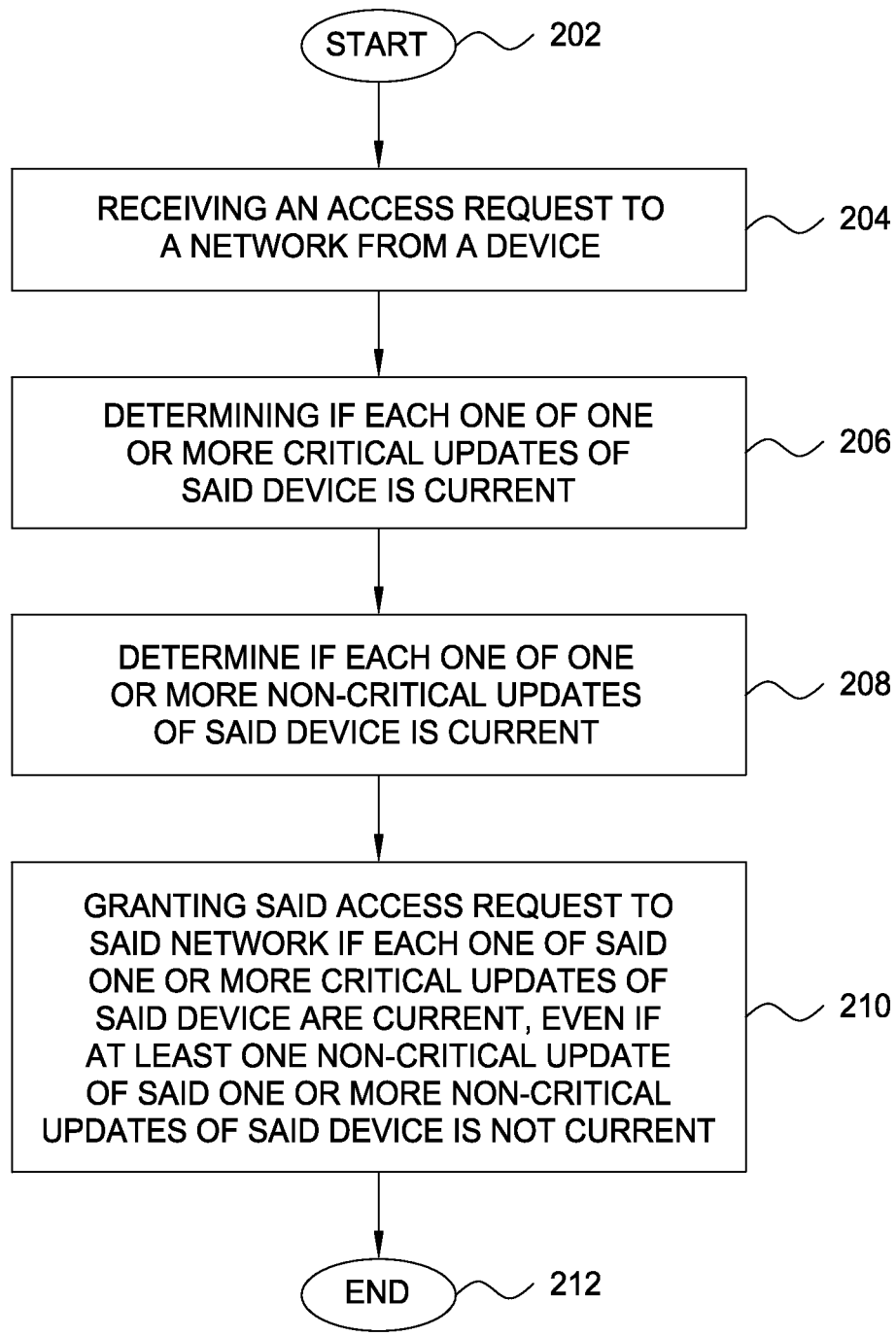
FIG. 2 illustrates an illustrative flow diagram depicting a method for retrieving a media file from a remote device in accordance with an embodiment of the present invention.

FIG. 2 depicts an illustrative flow diagram depicting a method 200 for optimizing network access control. For example, the method 200 can be implemented by the application server 106. The method 200 starts at step 202.

At step 204 the method 200 begins by receiving an access request to a network 102 from a device 104. In one embodiment, the request may be received by the application server 106.

At step 206 the method 200 determines if each one of the one or more critical updates of the device 104 is current. In one embodiment, the device 104 has a critical update timestamp. Alternatively, as discussed above, the device 104 may have been issued a COH 120 having a critical update timestamp 122, a non-critical update timestamp 124 and policy tags 126. In either case, the application server 106 may compare the critical update timestamp 122 of the device 104 with each one of the one or more current critical update timestamps received from the policy manager 108 and stored in the policy cache 128.

Similarly, at step 208 the method 200 determines if each one of the one or more non-critical updates of the device 104 is current. In one embodiment, the device 104 may have a non-critical update timestamp or simply have a COH 120 with the non-critical update timestamp 124. In either case, the application server 106 may compare the non-critical update timestamp 124 associated of the device 104 with each one of the one or more current non-critical update timestamps received from the policy manager 108.

At step 210 the method 200 may grant the access request if each one of the one or more critical updates of the device 104 are current, even if the non-critical update timestamp 124 of the device 104 is not current. For example, access may be granted if the critical update timestamp 122 of the device 104 is current, even if the non-critical update timestamp 124 of the device 104 is not current. As a result, aspects of the present invention provide the ability to distinguish between critical and non-critical updates and address non-compliant non-critical updates separately from non-compliant critical updates. In other words, non-compliant non-critical updates do not require immediate remediation and quarantine. This will be further discussed below with reference to FIGS. 3A and 3B.

Conversely, if each one of the one or more critical updates of the device 104 is not current, then access will be denied. The method 200 concludes at step 212.

Figure 3A:
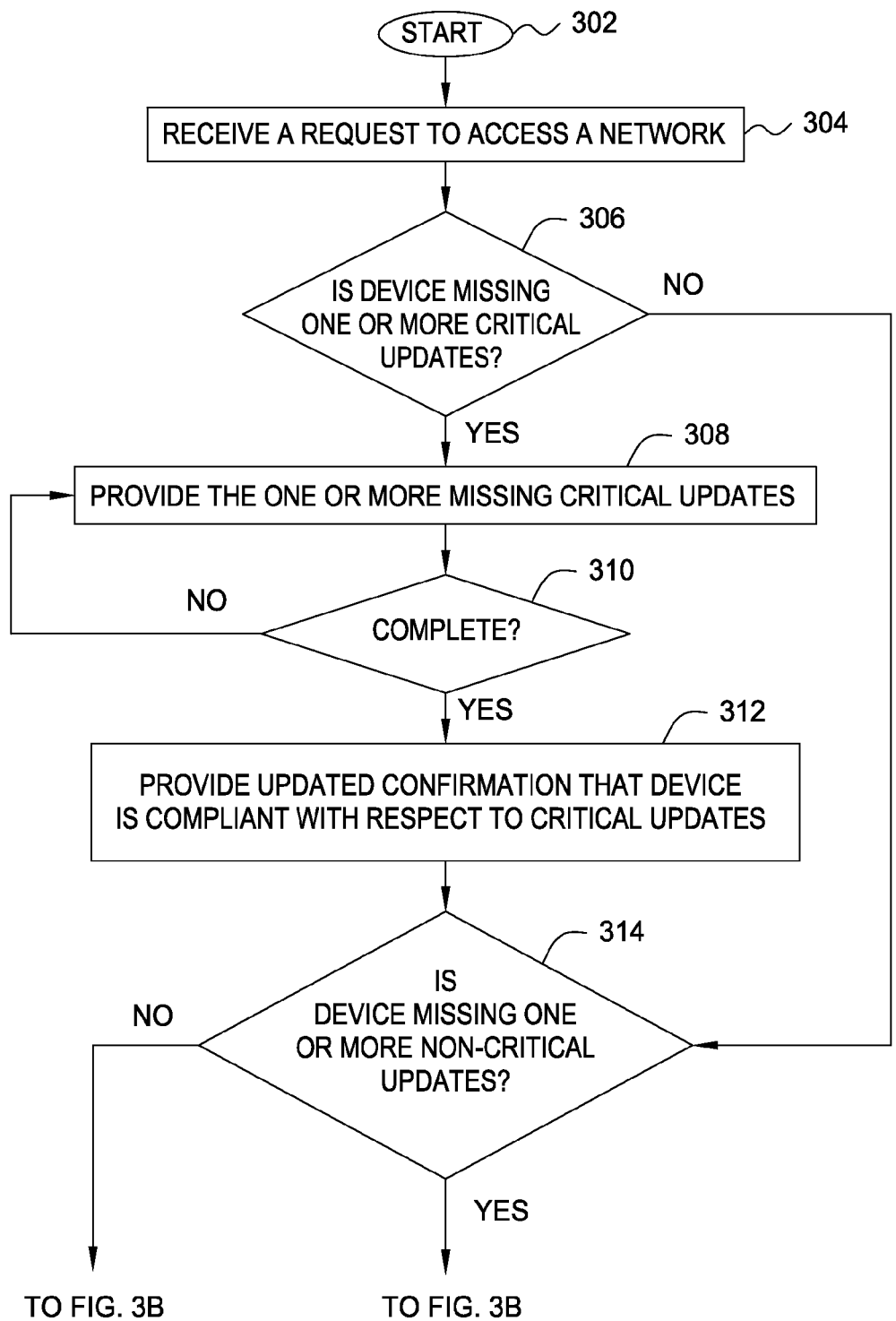
FIG. 3A illustrates an illustrative flow diagram depicting an alternate embodiment of a method for retrieving a media file from a remote device in accordance with an embodiment of the present invention.
Figure 3B:
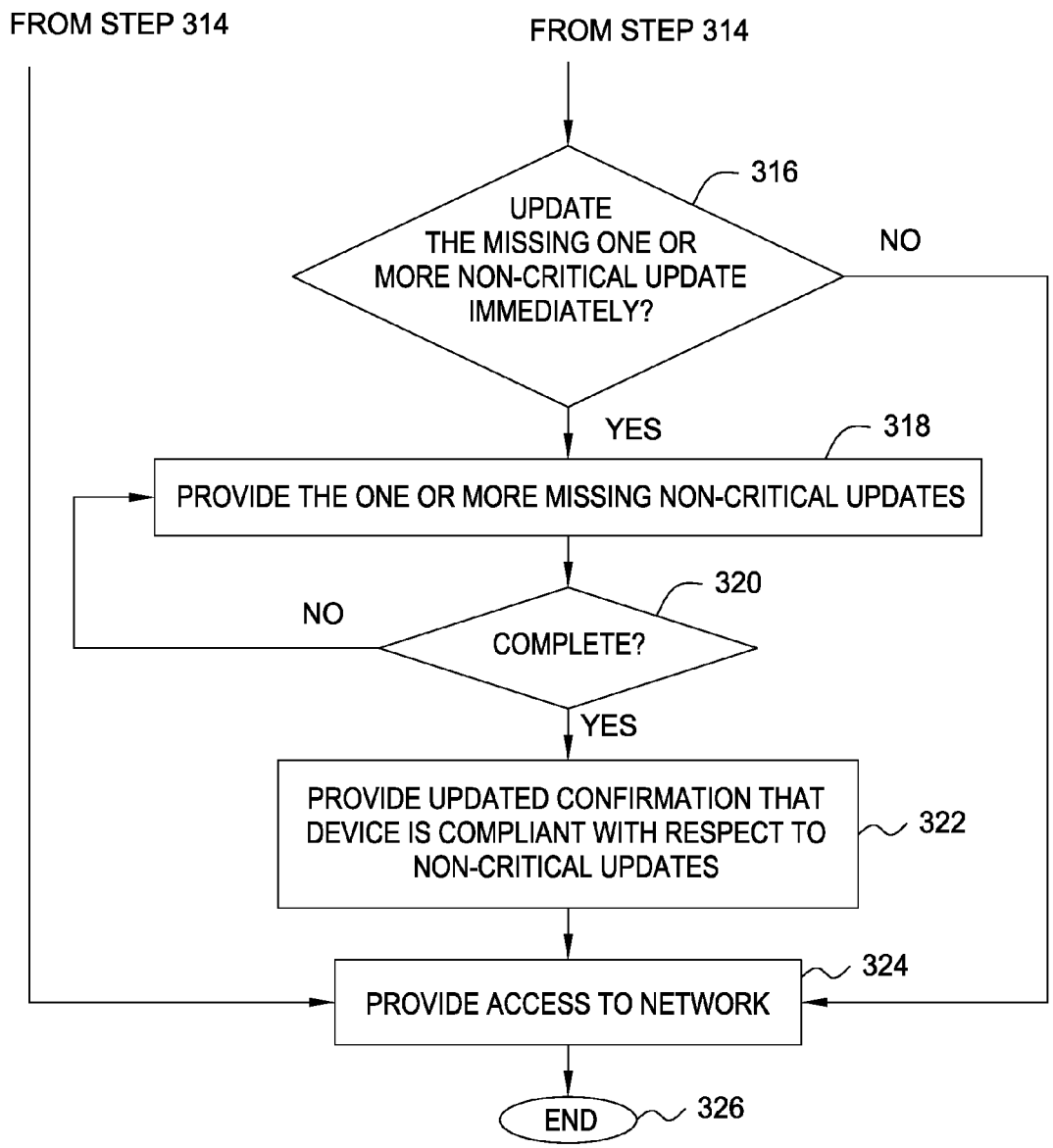
FIG. 3B is a continuation of the illustrative flow diagram depicted in FIG. 3A in accordance with an embodiment of the present invention.

FIGS. 3A and 3B provide an illustrative flow diagram of an alternate embodiment depicting a method 300 for optimizing network access. For example, method 300 can be implemented by application server 106. Method 300 is discussed below with reference to both FIGS. 3A and 3B simultaneously. Method 300 begins at step 302. At step 304, method 300 receives a request to access the network 102. For example the request may be from a device 104 and received by the application server 106.

At step 306, the method 300 determines if the device 104 is missing one or more critical updates. For example, the application server 106 may compare a critical update timestamp of the device 104 with timestamps of each one of the one or more critical updates received from the policy manager 108 and stored in the policy cache 128. Alternatively, the application server 106 may compare a critical update timestamp 122 of a COH 120 of the device 104 with the timestamps of the current critical updates received from the policy manager 108 and stored in the policy cache 128. If the device 104 is not missing any critical updates, then the method proceeds directly to step 314 to determine if the device is missing a non-critical update.

At step 314, a similar comparison is made, as made at step 306, by comparing a non-critical timestamp of the device 104 with timestamps of each one of the one or more non-critical updates received from the policy manager 108 and stored in the policy cache 128 or using the COH 120. If the device 104 is not missing any non-critical updates, then the device 104 is deemed in full compliance and the method proceeds directly to step 324 on FIG. 3B and is provided with access to network 102. The method 300 subsequently ends at step 326.

Referring back to step 306 on FIG. 3A, if the device is missing one or more critical updates, then the device 104 is deemed non-compliant and denied access to the network 102. Consequently, the method 300 performs an immediate quarantine and remediation at step 308 to provide the one or more missing critical updates to the device 104. In one embodiment, all missing critical updates are provided to the device at step 308. In one embodiment, the application server 106 may provide the one or more missing critical updates to the device 104 via the database 110. Alternatively, a mobile quarantine architecture (not shown) may be used.

Then at step 310, the method determines if the process of providing the one or more missing critical updates to device 104 is complete. If the process is not complete, then the method returns to step 308. For example, an update may occur over multiple connections of the device 104 to the network 102. To illustrate, a device 104 may be disconnected from the application server 106 before the complete missing critical update or updates are provided at step 308. As a result, step 308 may be repeated as many times as necessary upon subsequent requests by the device 104 to access the network 102 until the complete missing critical update or updates are provided to the device 104. Once the process of providing the one or more missing critical updates to the device 104 is completed, the method 300 then proceeds to step 312.

At step 312, an updated confirmation is provided that the device 104 is now compliant with respect to critical updates. In one embodiment, the updated confirmation may simply be issuing a new COH 120 to the device 104 with an updated critical update timestamp 122 by the application server 106. Then the method proceeds to step 314.

At step 314, the method 300 determines if the device 104 is missing one or more non-critical updates. If the device 104 is not missing any non-critical updates, then the method 300 proceeds directly to step 324 on FIG. 3B and the device 104 is provided access to the network 102, as discussed above. However, if the device 104 is missing one or more non-critical updates, then the method 300 proceeds to step 316 on FIG. 3A.

With reference now to FIG. 3B at step 316, the method 300 determines if the one or more missing non-critical update should be updated immediately. In one embodiment, an administrator may pre-define a threshold value that is stored at the application server 106. The predefined threshold value may be any value between 0 and 100. The value is simply a random number temporarily generated to determine whether a device 104 will receive a missing non-critical update during the current network access request or at a later time as will be further discussed below. The predefined threshold value may be associated with the non-critical update timestamp 124 at the application server 106.

At step 316, the application server may generate a random number between a minimum value and a maximum value, e.g., 0 and 100, for the device 104. If the random number is less than or equal to the predefined threshold value, then the method 300 may proceed to step 318 and at least one of the one or more missing non-critical update are provided immediately. Alternatively, all of the one or more missing non-critical updates may be provided immediately. However, if the random number is greater than the predefined threshold value, then the method 300 may defer updating the one or more missing non-critical updates of the device 104 and proceed directly to step 324 and the device 104 may be provided access to the network 102.

As a result, aspects of the present invention provide the ability to defer updates to one or more missing non-critical updates at a later time even when both a critical update and a non-critical update of the device 104 are non-compliant. In other words, immediate remediation for the non-critical update is not necessary.

In addition, it noted that aspects of the present invention provide network load balancing for the one or more missing non-critical updates. For example, as described above, if 1000 employee devices 104 attempt to access the network 102 on the same day and all 1000 employee devices 104 are missing one or more non-critical updates, then the network may be overwhelmed with providing the necessary updates, thereby, causing problems on the network 102. However, in an embodiment, aspects of the present invention are able to ensure that only some of the employee devices 104 that only require the missing non-critical updates will be updated immediately via the use of the randomly generated values, while the remaining will be updated over a pre-defined period of time.

In one embodiment, the administrator may desire that all the devices 104 receive the missing non-critical update over a period of, for example, one week. As a result, the administrator may slowly increase the pre-defined threshold value up to its maximum value over a period of seven days. For example, the first day the pre-defined threshold value may be 15. On the second day the pre-defined threshold value may be 30. On the third day the pre-defined threshold value may be 45, and so on, up to the maximum value (e.g., 100). Those skilled in the art will recognize that any pre-defined period of time may be used, such as for example, one hour, one day, one week, two weeks, one month, three months, and the like. In addition, the pre-defined threshold value may be incremented by any amount and the present example should not be interpreted as a limitation of the present invention. In one embodiment, the pre-defined threshold value does not necessarily have to be incremented evenly. For example, if the pre-defined period of time includes a Saturday when only a few or relatively small number of employees access the network 102, the administrator may increase the pre-defined threshold value from 50 directly to 100 on Saturday.

Notably, if the one or more missing non-critical updates are not provided immediately at step 316, then when the device 104 subsequently attempts to access the network 102 at a later time, method 300 may be repeated. Then at that later time, when the method 300 reaches step 316, again the method 300 may determine whether the one or more missing non-critical updates should be provided immediately, as described above.

Referring back to step 316, if the one or more missing non-critical updates are to be provided immediately, then the method 300 proceeds to step 318. Then at step 320, the method 300 determines if the process of providing the one or more non-critical updates to the device 104 is complete. If the process is not complete, then the method 300 returns to step 318. For example, an update may occur over multiple connections of the device 104 to the network 102. To illustrate as discussed above, a device 104 may be disconnected from the application server 106 before the complete missing non-critical update or updates are provided at step 318. As a result, step 318 may be repeated as many times as necessary upon subsequent requests by the device 104 to access the network 102 until the complete missing non-critical update or updates are provided to the device 104. Once the process of providing the one or more missing non-critical updates to device 104 is completed, the method 300 then proceeds to step 322.

At step 322, an updated confirmation is provided that the device 104 is now compliant with respect to non-critical updates. In one embodiment, the updated confirmation may simply be issuing a new COH 120 to the device 104 with an updated non-critical update timestamp 124 by the application server 106. Then the method 300 proceeds to step 324, where the device 104 is provided access to the network 102. Subsequently, the method 300 concludes at step 326.

Those skilled in the art will recognize that one or more steps in methods 200 and 300 may occur simultaneously or in parallel. For example, in one embodiment, the non-critical update may be provided to the device 104 in the background, while the device 104 is connected to the network 102. In other words, steps 318-322 and 324 may occur in parallel. For example, the device 104 may be provided access to the network 102 and while the device 104 is connected to the network 102, the non-critical updates and the updated confirmation that the device is compliant may be provided.

It should be noted that although not specified, one or more steps of methods 200 and 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIGS. 2, 3A and 3B that recite a determining operation or involve a decision do not necessarily require that both branches of the determining operation be practiced. In other words, one of the branches of the determining operation can be deemed as an optional step.

Figure 4:
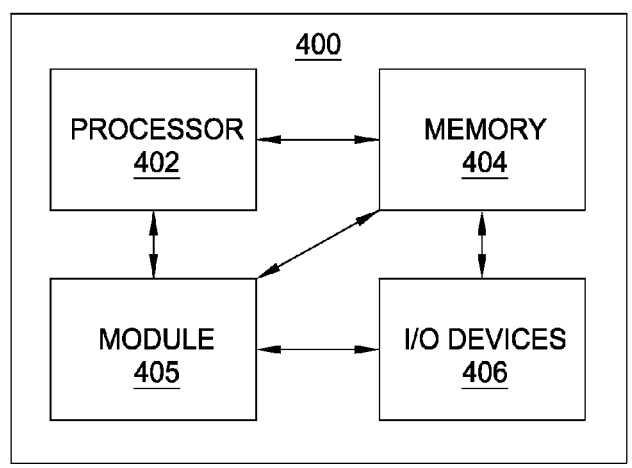
FIG. 4 illustrates a high level block diagram of an illustrative general purpose computer suitable for use in performing the functions described herein in accordance with an embodiment of the present invention.

FIG. 4 illustrates a high level block diagram of an illustrative general purpose computer suitable for use in performing the functions described herein. As depicted in FIG. 4, the general purpose computer 400 comprises a processor element 402 (e.g., a CPU), a memory 404, e.g., random access memory (RAM) and/or read only memory (ROM), a module 405 for optimizing network access control and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the processes provided by the present module 405 for optimizing network access control can be loaded into memory 404 and executed by processor 402 to implement the functions as discussed above. As such, the processes provided by the module 405 for optimizing network access control of the present invention can be stored on a computer readable medium, e.g., RAM memory, magnetic or optical drive or diskette and the like.

While the foregoing is directed to illustrative embodiments of the present invention, other and further embodiments of the invention may be devised without departing from the basic scope thereof, and the scope thereof is determined by the claims that follow.

What is claimed is:

1. A method for optimizing network access control, comprising:

in a server comprising one or more processors communicatively coupled to a network:
  receiving, from a policy manager, a timestamp for each of one or more current critical updates and one or more current non-critical updates;
  maintaining a list of current critical updates and current non-critical updates for one or more devices communicatively coupled to the network, wherein said list comprises said timestamp for each of said one or more current critical updates and said one or more current non-critical updates; and
  for all access requests to the network from a device of the one or more devices communicatively coupled to the network:
    receiving, in the server, an access request to the network from said device;
    determining if each one of said one or more critical updates of said device is current;
    determining if each one of said one or more non-critical updates of said device is current;
    granting to the device said access request to said network if each one of said one or more critical updates of said device is current, even if at least one non-critical update of said one or more non-critical updates of said device is not current; and
    if at least one critical update of said one or more critical updates of said device is not current:
      denying said access request to said network; and
      providing to said device at least one current critical update;
    wherein said determining steps comprise:
      receiving a critical update timestamp and a non-critical update timestamp from said device; and
      comparing said critical update timestamp from said device with said timestamp for each of said current critical updates and comparing said non-critical update timestamp from said device with said timestamp for each of said current non-critical updates in said list.

2. The method of claim 1, wherein said providing to said device at least one current critical update occurs during multiple connections of said device to said network.

3. The method of claim 1, further comprising:
for all access requests to the network from the device, determining if said at least one non-critical update is to be updated on the device before granting said access request.

4. The method of claim 3, wherein said determining if said at least one non-critical update is to be updated before granting said access request comprises:
generating a random number;
comparing said random number to a predefined threshold value; and
if said random number is less than or equal to said predefined threshold value, providing at least one current non-critical update.

5. The method of claim 4, wherein said providing at least one current non-critical update occurs over multiple connections of said device to said network.

6. The method of claim 4, wherein if said random number is greater than said predefined threshold value, providing access to said network without providing at least one current non-critical update.

7. The method of claim 4, wherein said predefined threshold value is gradually increased over a predefined period of time until said predefined threshold value equals a maximum value.

8. A non-transitory computer-readable medium having stored thereon a plurality of instructions, said plurality of instructions including instructions which, when executed by one or more processors of a server, cause said one or more processors to perform steps of a method for optimizing network access control, the steps comprising:
receiving, from a policy manager, a timestamp for each of one or more current critical updates and one or more current non-critical updates;
maintaining a list of current critical updates and current non-critical updates for one or more devices communicatively coupled to the network, wherein said list comprises said timestamp for each of said one or more current critical updates and said one or more current non-critical updates; and
for all access requests to the network from a device of the one or more devices communicatively coupled to the network:
receiving, in the server, an access request to the network from said device;
determining if each one of said one or more critical updates of said device is current;
determining if each one of said one or more non-critical updates of said device is current; and
granting to the device said access request to said network if each one of said one or more critical updates of said device is current, even if at least one non-critical update of said one or more non-critical updates of said device is not current; and
if at least one critical update of said one or more critical updates of said device is not current:
denying said access request to said network; and
providing to said device at least one current critical update;
wherein said determining steps comprise:
receiving a critical update timestamp and a non-critical update timestamp from said device; and
comparing said critical update timestamp from said device with said timestamp for each of said current critical updates and comparing said non-critical update timestamp from said device with said timestamp for each of said current non-critical updates in said list.

9. The computer readable medium of claim 8, the steps further comprising:
for all access requests to the network from the device, determining if said at least one non-critical update is to be updated on the device before granting said access request.

10. The computer readable medium of claim 9, wherein said determining if said at least one non-critical update is to be updated before granting said access request comprises:
generating a random number;
comparing said random number to a predefined threshold value; and
if said random number is less than or equal to said predefined threshold value, providing at least one current non-critical update.

11. The computer readable medium of claim 10, wherein if said random number is greater than said predefined threshold value, providing access to said network without providing at least one current non-critical update.

12. The computer readable medium of claim 10, wherein said predefined threshold value is gradually increased over a predefined period of time until said predefined threshold value equals a maximum value.

13. A system for optimizing network access control, comprising:
an application server comprising one or more processors communicatively coupled to a network;
a database communicatively coupled to said one or more processors of the application server, the database configured for storing one or more current critical updates and one or more current non-critical updates; and
a policy manager communicatively coupled to said one or more processors of the application server, the policy manager configured for updating said one or more current critical updates and said one or more current non-critical updates;
the one or more processors of the application server configured for:
receiving, from the policy manager, a timestamp for each of one or more current critical updates and one or more current non-critical updates;
maintaining a list of current critical updates and current non-critical updates for one or more devices communicatively coupled to the network, wherein said list comprises said timestamp for each of said one or more current critical updates and said one or more current non-critical updates; and
for all access requests to the network from a device of the one or more devices communicatively coupled to the network:
receiving, in the server, an access request to the network from said device;
determining if each one of said one or more critical updates of said device is current;
determining if each one of said one or more non-critical updates of said device is current; and
granting to the device said access request to said network if each one of said one or more critical updates of said device is current, even if at least one non-critical update of said one or more non-critical updates of said device is not current; and
if at least one critical update of said one or more critical updates of said device is not current:

denying said access request to said network; and
providing to said device at least one current critical update;
wherein said determining comprises:
receiving a critical update timestamp and a non-critical update timestamp from said device; and
comparing said critical update timestamp from said device with said timestamp for each of said current critical updates and comparing said non-critical update timestamp from said device with said timestamp for each of said current non-critical updates in said list.

14. The system of claim 13, wherein said application server determines if said at least one non-critical update is to be updated on the device before granting said access request.

15. The system of claim 14, wherein said application server further comprises, in a storage device communicatively coupled to the one or more processors:

a certificate of health; and
a policy cache.

16. The system of claim 15, wherein said policy cache stores timestamps received from said policy manager for said one or more current critical updates and said one or more current non-critical updates.

17. The system of claim 15, wherein said certificate of health comprises:

a critical update timestamp;
a non-critical update timestamp; and
at least one policy tag.

18. The system of claim 15, the one or more processors of the application server further configured to issue said certificate of health to said device if said device receives at least one critical update or non-critical update.

* * * * *